United States Patent [19]
Prinzler et al.

[11] Patent Number: 5,509,641
[45] Date of Patent: Apr. 23, 1996

[54] AIR SPRING WHICH INCLUDES A VIBRATION ABSORBING MASS

[75] Inventors: Hubertus Prinzler, Langenhagen; Hubertus Gawinski, Lehrte, both of Germany

[73] Assignee: Continental Aktiengesellschaft, Hanover, Germany

[21] Appl. No.: 356,522

[22] Filed: Dec. 15, 1994

[51] Int. Cl.[6] .................................................. F16F 9/05
[52] U.S. Cl. ................................. 267/64.19; 267/64.28
[58] Field of Search ........................ 267/35, 64.17, 267/64.19, 64.23, 64.24, 64.27, 64.28, 140.11, 140.3, 141; 188/378–380

[56] References Cited

FOREIGN PATENT DOCUMENTS

| | | | |
|---|---|---|---|
| 1003608 | 2/1957 | Germany | 267/64.27 |
| 1285792 | 12/1968 | Germany . | |
| 3246599 | 6/1984 | Germany . | |
| 3641623 | 6/1987 | Germany . | |
| 167943 | 7/1987 | Japan | 267/64.27 |
| 5196083 | 8/1993 | Japan | 267/64.28 |
| 6017867 | 1/1994 | Japan | 267/64.19 |
| 1458629 | 2/1989 | U.S.S.R. | 267/64.27 |
| 1521953 | 11/1989 | U.S.S.R. | 267/64.27 |

*Primary Examiner*—Josie Ballato
*Attorney, Agent, or Firm*—Walter Ottesen

[57] ABSTRACT

The invention is directed to an air spring which supports a vehicle body on another vibrating component with an air spring flexible member which can be charged with pressurized air. The ends of the air spring flexible member are mounted air tight on respective connecting parts. One of the connecting parts is mounted on the vehicle body and the other connecting part is mounted on a vehicle component. The connecting part mounted on the vehicle component includes an elastically tied vibration absorber mass in order to reduce vibrations of the vehicle component in the resonant region.

6 Claims, 3 Drawing Sheets

AIR SPRING WHICH INCLUDES A VIBRATION ABSORBING MASS

BACKGROUND OF THE INVENTION

Air springs having elastomeric air-spring flexible members are known in a great many embodiments and are used successfully, for example, as vehicle springs and especially for suspending vehicle assemblies with respect to the wheel axles of trucks and buses or a driver cab with respect to the vehicle chassis. The air spring flexible members are tightly attached at their ends to respective parts which are usually made of metal or plastic. The air spring flexible member is connected via the connecting parts to the vehicle chassis, on the one hand, and to the vehicle axle, on the other hand.

It has been determined that vibrations occur at the axle in a motor vehicle suspended by air springs. These vibrations can lie at the natural frequency of the axle.

The vibrations on the axle are, for example, introduced by the upward impact of a wheel or by the unevenness of the road surface. If these vibrations are at the natural frequency of the axle, then this has negative effects on the driving comfort and on the driving safety of the vehicle. It has been furthermore determined that the vehicle body supported by the air spring can be excited to mechanical oscillations or vibrations by the larger oscillating forces. These vibrations become disturbingly noticeable in the body of the vehicle. Furthermore, structure borne noise can be radiated because of this excitation.

SUMMARY OF THE INVENTION

It is an object of the invention to provide an air spring of the kind referred to above wherein vibrations of the vehicle component are reduced in the resonance range by the configuration of the air spring.

The air spring of the invention is for supporting a vehicle body on a vehicle component to which vibrations are imparted in a predetermined resonance frequency range. The air spring includes: an air spring member charged with pressurized air and having first and second ends; a first attachment part mounted on the vehicle body and a second attachment part mounted on the vehicle component; the first and second ends of the air spring member being attached to the first and second attachment parts, respectively; and, vibration absorbing mass means elastically connected to the vehicle component for reducing the vibrations in the resonance frequency range.

The second attachment part referred to above and mounted on the vehicle component therefore includes an integrated vibration absorber which reduces the vibrations in the range of resonance of the vehicle component. The absorber mass is integrated into the attachment part mounted on the vehicle component. In this way, the disturbing vibrations of this component in resonance are reduced in a targeted manner. The absorber mass is supported by elastic means in the form of an elastomeric spring element with respect to the air spring attachment part. The elastomeric spring element is matched in stiffness and damping to the particular natural frequency of the vehicle component.

The flexible member is tightly attached at least at one end thereof to a roll-off piston. This roll-off piston functions as a connecting part and is, for vehicles, attached to the vehicle axle. During operation of the air spring, the roll-off piston moves within the flexible member because of the compression or rebound. The flexible member turns down and defines a rolling lobe which rolls over the outer surface of the roll-off piston in dependence upon the compression movement or rebound movement.

The annularly-shaped vibration absorber mass provides a rotationally-symmetric configuration of the roll-off piston which is easy to manufacture.

According to another feature of the invention, the elastomeric body of the vibration absorber can be subjected unilaterally to a pressure which is varied. In this way, the stiffness of the elastomeric body (absorber support) can be adjusted. A detuning of the vibration absorber can be obtained with applications of different pressures to this elastomeric body. Changing the stiffness of the elastomeric body by changing the air pressure applied thereto shifts the natural frequency of the vibration absorber as required. In this way, the vibration absorber can be adapted to different resonance frequencies of a vehicle component.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
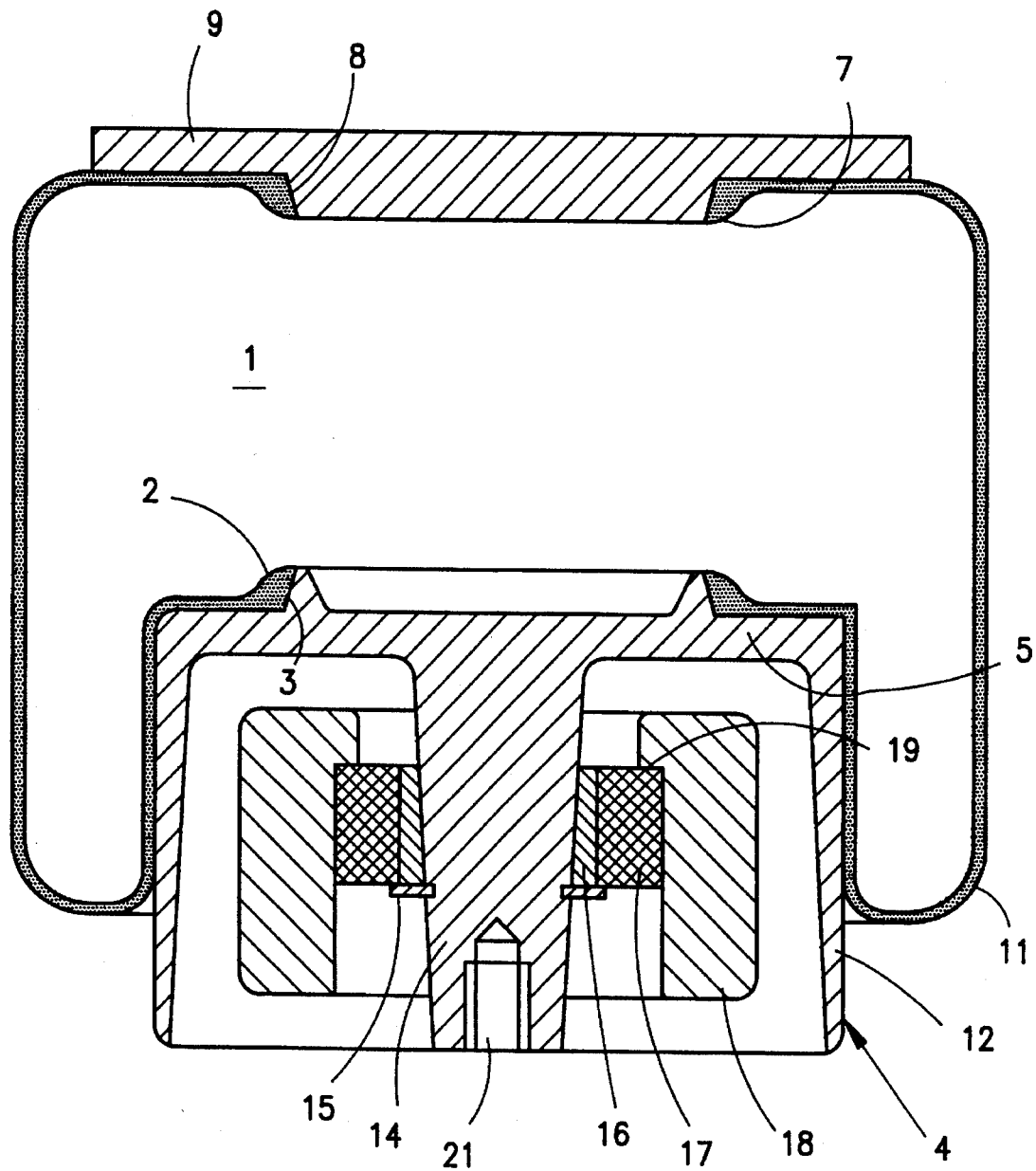
FIG. 1 shows an air spring according to the invention for supporting a vehicle body on another vibrating vehicle component such as an axle; and, FIG. 2a shows a first alternate embodiment of FIG. 1 modified to include an elastomeric body to which pressurized air can be applied via a channel connected to the air spring to thereby shift the natural frequency of the vibration absorbing mass and, FIG. 2B shows a second alternate embodiment of FIG. 1 modified to include an elastomeric body to which pressurized air can be applied via a channel connected to a pressurized means to shift the natural frequency of the vibration absorbing means.

The air spring shown in the drawing includes an elastomeric flexible member 1 which has upper and lower ends. The lower end is delimited by a conical bead 2 and is seated on a conical seal seat 3 of a roll-off piston 4. The conical seal seat 3 has a diameter less than the diameter of the roll-off piston 4 and is disposed on the upper end plate 5 of the piston 4. The flexible member 1 has a bead 7 at its upper end with which the flexible member is mounted on a conical seal seat 8 of a connecting part which is configured as a connecting plate 9. The connecting plate 9 is attached to a vehicle chassis via elements which are not shown; whereas, the roll-off piston 4 is mounted on a part of the vehicle axle.

The flexible member 1 is shown in the operating state of the air spring. A rolling lobe 11 of the flexible member 1 forms and rolls over the outer surface of the piston wall 12 of the roll-off piston during compression and rebound.

The roll-off piston 4 includes a central support projection 14 which is conically tapered downwardly. The support projection 14 is connected to the piston wall 12 via the horizontal end plate 5 of the roll-off piston 4 and is surrounded by the piston wall 12 which is arranged concentrically. The support projection 14 includes a retaining ring 15 on which a conical metal sleeve 16 rests. The outer periphery of the conical metal sleeve 16 and an intermediate ring 17 of rubber are vulcanized together to define a hub-like configuration. The outer periphery of the intermediate ring 17 supports an annular absorber mass 18 which is vulcanized thereto. The annular absorber mass 18 is supported by a step 19 in a form-tight manner on the upper end face of the intermediate ring 17.

The base of the roll-off piston 4 is provided with a threaded bore 21 by means of which the roll-off piston is securely connected to a lower vehicle component such as a vehicle axle.

Figure 2A:
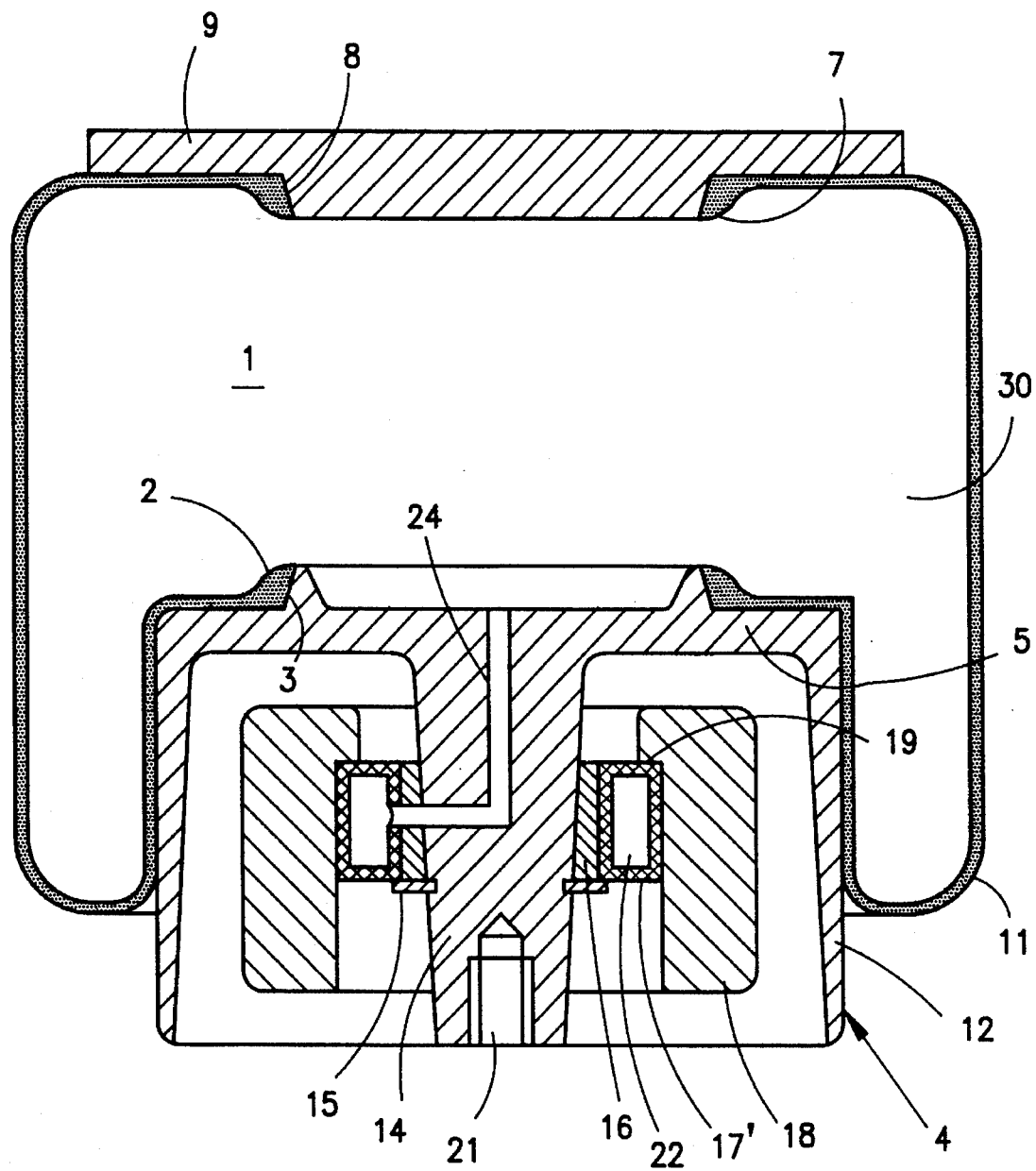

FIG. 2A shows a first alternate embodiment of the invention wherein the vibration absorber includes an elastomeric body 17' having a cavity 22 formed therein. The elastomeric body 17' is, in effect, a spring having a stiffness which can be varied by varying the pressure of the air supplied to cavity 22. The first alternate embodiment includes a channel 24 interconnecting the interior 30 of the air spring and the cavity 22. In this embodiment, the air pressure in cavity 22 is varied in dependence upon the pressurized air in the air spring. Accordingly, the stiffness of the elastomeric body 17' is also varied in dependence upon this pressurized air of the air spring.

Figure 2B:
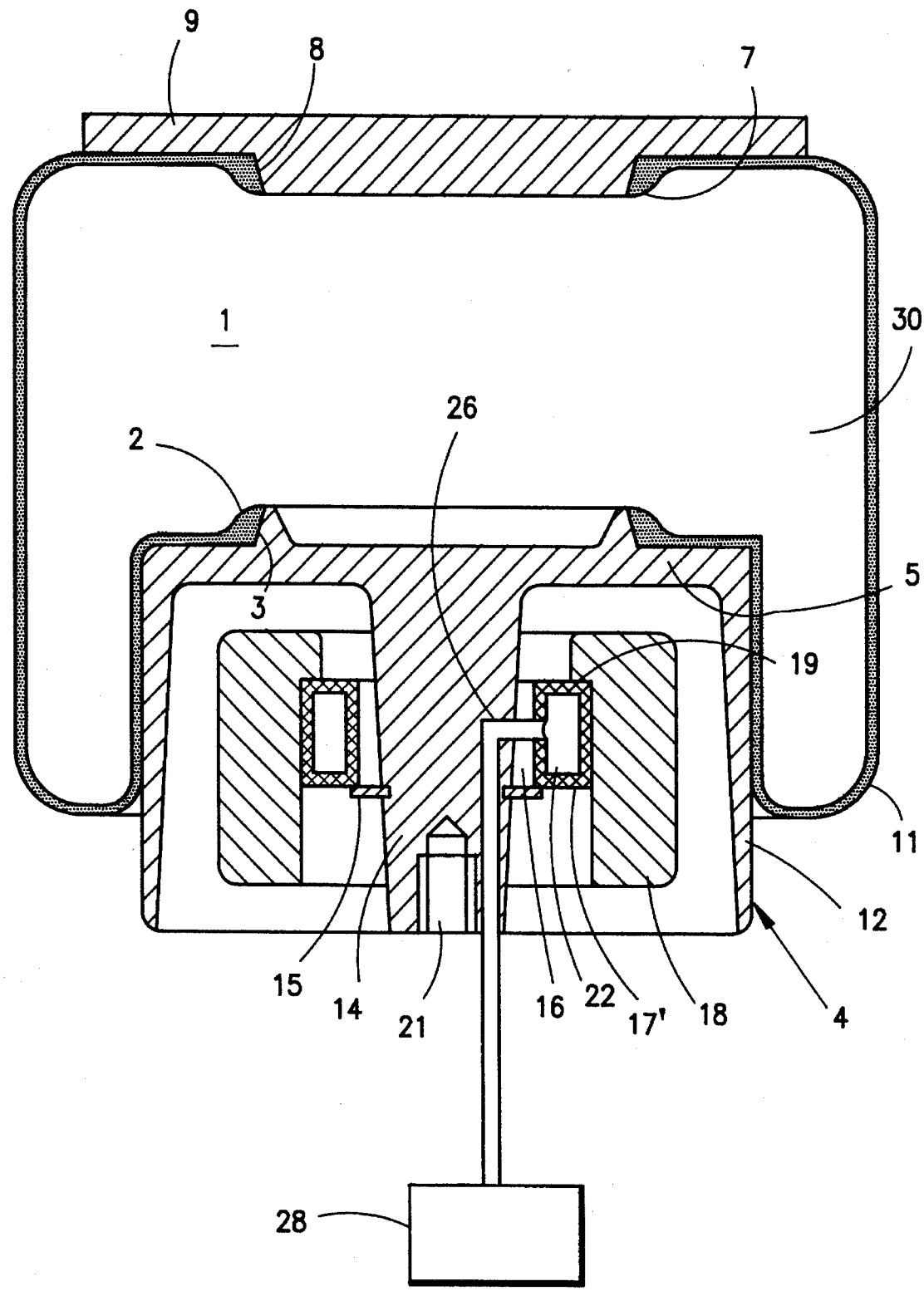

In lieu of the channel 24 shown in FIG. 2A, a channel 26 can be provided as shown in FIG. 2B. The channel 26 connects the cavity 22 to a pressurizing means 28 for pressurizing the air in a controlled manner. In this embodiment, the stiffness of elastomeric body 17', and therefore the natural frequency of the vibration absorber, is varied in dependence upon the pressure of the air pressurized by the pressurizing means 28.

When driving over an uneven road surface, the vehicle axle is excited to vibrate via the tires also in the resonant range of the vehicle axle. The roll-off piston is fixedly connected to the axle so that the vibration absorber, which is arranged in the roll-off piston, is also excited. The vibration absorber is designed to the axle resonance. In this way, a vibration opposite in phase to the axle vibration is obtained. The vibration absorber operates oppositely to the axle vibrations and reduces the latter. In this way, less vibration energy is transmitted via the air spring to the vehicle chassis which leads to a reduction of the disturbing influences of the axle vibrations.

It is understood that the foregoing description is that of the preferred embodiments of the invention and that various changes and modifications may be made thereto without departing from the spirit and scope of the invention as defined in the appended claims.

What is claimed is:

1. An air spring for supporting a vehicle body on a vehicle component to which vibrations are imparted in a predetermined resonance frequency range, the air spring comprising:

an air spring flexible member charged with pressurized air and having first and second ends;

a first attachment part mounted on said vehicle body and a second attachment part mounted on said vehicle component;

said first and second ends of said air spring flexible member being attached to said first and second attachment parts, respectively;

vibration absorbing mass means elastically connected to said second attachment part for reducing said vibration in said resonance frequency range;

said second attachment part being a roll-off piston mountable on said vehicle component;

said vibration absorbing mass means including a vibration absorbing mass; and, elastic means for elastically mounting said vibrations absorbing mass in said roll-off piston;

said roll-off piston defining an enclosed space and having a support projection disposed therein and said support projection being disposed concentrically with respect to said roll-off piston;

said elastic means being an elastomeric body mounted on said support projection; and, said vibration absorbing mass including an annularly-shaped vibration absorbing mass mounted on said elastomeric body.

2. The air spring of claim 1, said annularly-shaped vibration absorbing mass including: an inner hub-shaped body made of hard material and being mounted on said support projection; and, an outer ring-shaped body disposed in spaced relationship to said inner hub-shaped body; and, said elastomeric body being an annular body sandwiched between said inner hub-shaped body and said outer ring-shaped body for elastically connecting said inner hub-shaped body and said outer ring-shaped body to each other; and, said outer ring-shaped body having a mass greater than that of said inner hub-shaped body.

3. The air spring of claim 1, said vibration absorbing mass means having a natural frequency; and, said elastomeric body having a stiffness which can be varied and having a cavity formed therein; and, pressurized air supply means for supplying air under pressure to said cavity and for changing said pressure to adjust said stiffness of said elastomeric body thereby shifting said natural frequency to reduce said vibrations in said resonance frequency range.

4. The air spring of claim 3, wherein said pressurized air supply means is a channel interconnecting said air spring and said cavity of said elastomeric body whereby said stiffness is varied in dependence upon said pressurized air of said air spring.

5. The air spring of claim 3, said pressurized air supply means includes: pressurizing means for pressurizing air in a controlled manner; and, and channel means for connecting said pressurizing means to said cavity whereby said stiffness is varied in dependence upon the pressure of the air pressurized by said pressurizing means.

6. The air spring of claim 1, wherein said vehicle component is a wheel axle.

* * * * *